US008601282B2

(12) United States Patent
Ikeda et al.

(10) Patent No.: US 8,601,282 B2
(45) Date of Patent: Dec. 3, 2013

(54) PROGRAM AND DEVICE FOR USING SECOND UNCORRUPTED MBR DATA STORED IN AN EXTERNAL STORAGE

(75) Inventors: Minoru Ikeda, Funabashi (JP); Romuald Rousseau, Yokohama (JP); Koichi Shirasuka, Tokyo (JP)

(73) Assignee: Eugrid Inc. (JP)

( * ) Notice: Subject to any disclaimer, the term of this patent is extended or adjusted under 35 U.S.C. 154(b) by 0 days.

(21) Appl. No.: 13/464,764

(22) Filed: May 4, 2012

(65) Prior Publication Data
US 2012/0246486 A1 Sep. 27, 2012

Related U.S. Application Data

(62) Division of application No. 12/516,789, filed as application No. PCT/JP2007/054203 on Mar. 5, 2007, now Pat. No. 8,234,717.

(30) Foreign Application Priority Data

Dec. 4, 2006 (JP) ................................ 2006-326594

(51) Int. Cl.
*G06F 13/38* (2006.01)
*G06F 12/10* (2006.01)

(52) U.S. Cl.
USPC ........................................... 713/189; 713/191

(58) Field of Classification Search
None
See application file for complete search history.

(56) References Cited

U.S. PATENT DOCUMENTS

| 4,808,802 A | 2/1989 | Kano ............................ 235/380 |
| 7,694,121 B2 | 4/2010 | Willman et al. .................. 713/2 |
| 2002/0166059 A1 | 11/2002 | Rickey et al. ................. 713/200 |
| 2002/0174307 A1 | 11/2002 | Yoshida et al. ............... 711/152 |
| 2003/0005336 A1 | 1/2003 | Poo et al. ....................... 713/202 |
| 2003/0005337 A1 | 1/2003 | Poo et al. ....................... 713/202 |
| 2003/0046359 A1 | 3/2003 | Betz et al. ...................... 709/216 |
| 2006/0005034 A1 | 1/2006 | Willman et al. ............... 713/182 |
| 2006/0129793 A1 | 6/2006 | Tzeng .............................. 713/2 |
| 2007/0011445 A1 | 1/2007 | Waltermann et al. ............. 713/2 |

FOREIGN PATENT DOCUMENTS

| DE | 19852250 | 6/1999 | ............. G06F 12/00 |
| JP | 62-287388 | 12/1987 | ............. G06K 19/00 |
| JP | 63-54294 | 3/1988 | ............. G06K 17/00 |
| JP | 63-103396 | 5/1988 | ............. G06K 19/00 |

(Continued)

OTHER PUBLICATIONS

Eugrid, Shaghai Thin client [Eugrid Secure Client Mobail Option] Hanbai, Venture Now, Oct. 31, 2006. [retrieved on Mar. 20, 2007], Retrieved from the Internet: <URL:http://www.venturenow.jp/news/2006/10/31/1217_013389.html>.

(Continued)

*Primary Examiner* — Venkat Perungavoor
(74) *Attorney, Agent, or Firm* — Hayes Soloway P.C.

(57) ABSTRACT

[PROBLEMS] To prevent leak of information because loss or theft judgement is made whether or not read control information stored in a predetermined read control information storage area of an external storage is proper. If the judgment result shows that it is invalid, virtualized data stored in the external storage is decrypted, and genuine read control information virtualized in the virtualized data is extracted. Next judgement is made whether or not the extracted genuine read control information is proper. If the extracted genuine read control information is proper, the virtualized genuine data in the virtualized data along with the genuine read control information is made usable by decrypting and creating the virtualized data, and improper read control information is stored in the read control information storage area.

2 Claims, 8 Drawing Sheets

(56) References Cited

FOREIGN PATENT DOCUMENTS

| | | | |
|---|---|---|---|
| JP | 8-95866 | 4/1996 | ............ G06F 12/14 |
| JP | 9-223076 | 8/1997 | ............ G06F 12/14 |
| JP | 10-69436 | 3/1998 | ............ G06F 12/14 |
| JP | 10-240625 | 9/1998 | ............ G06F 12/14 |
| JP | 11-212874 | 8/1999 | ............ G06F 12/14 |
| JP | 2001-142785 | 5/2001 | ............ G06F 12/14 |
| JP | 2002-189635 | 7/2002 | ............ G06F 12/14 |
| JP | 2002-196980 | 7/2002 | ............ G06F 12/08 |
| JP | 2004-505026 | 2/2004 | |
| JP | 2004-70467 | 3/2004 | ............ G06F 9/445 |
| JP | 2004-127183 | 4/2004 | ............ G06K 19/00 |
| JP | 2004-519791 | 7/2004 | ............ G06F 12/14 |
| JP | 2006-133920 | 5/2006 | ............. G06F 1/00 |
| JP | 2006-139489 | 6/2006 | ............ G06F 15/00 |
| JP | 2006-172351 | 6/2006 | ............ G06F 21/24 |
| JP | 2006-309370 | 11/2006 | ............ G06F 21/24 |
| JP | 2007-304682 | 11/2007 | ............ G06F 21/24 |
| WO | WO 03/003282 | 1/2003 | ............. G06K 9/00 |
| WO | WO 03/003283 | 1/2003 | ............. G06K 9/00 |

OTHER PUBLICATIONS

International Preliminary Report on Patentability, PCT/JP2007/054203, dated Mar. 5, 2007 (5 pgs).

International Search Report, PCT/JP2007054203, dated Apr. 3, 2007 (6 pgs).

International Search Report, PCT/JP2008/073226, Dated Mar. 31, 2009.

Rumi Kunii, "Tsukatte Oboeru! USB Memory 'Mitame' mo 'Nakami' mo Sonomama Saigen Settei ya File o Matomete Mochihakobu", Nikkei PC21, Oct. 1, 2007, vol. 12, No. 10, pp. 144-147.

Shinseihin Joho Now Arriving Software infor, PCfan, Mar. 15, 2005, vol. 12, No. 5, p. 38.

International Preliminary Report on Patentability issued in corresponding PCT/JP2008/073226, dated Dec. 13, 2010 (6 pgs).

European Search Report dated Mar. 3, 2011 issued in Application No. EP07737778 (8 pages).

"TRUCRYPT Free Open-Source-On-The-Fly Encryption User S Guide" Version 4.2a. Released Jul. 3, 2006 (106 pgs).

European Search Report dated Aug. 8, 2011 issued in Application No. EP08873778 (10 pgs).

HPC:Factor "Moving the Temporary Internet Files Storage Cache Onto a Storage Card" published Jul. 16, 2006 (1 pg).

Office Action in U.S. Appl. No. 12/921,558 dated Nov. 6, 2012 (17 pgs).

Official Action issued in U.S. Appl. No. 12/516,789 dated Sep. 27, 2011 (34 pgs).

Japanese Office Action, dated Jun. 19, 2012 (3 pgs).

Article downloaded Jun. 25, 2012 from trendy.nikkeibp.co.jp website (5 pgs).

Fig.4 (a) NORMAL (CONVENTIONAL)
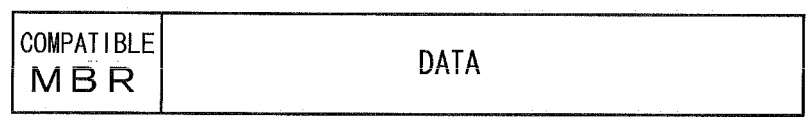
Fig.4 (b) PRESENT INVENTION
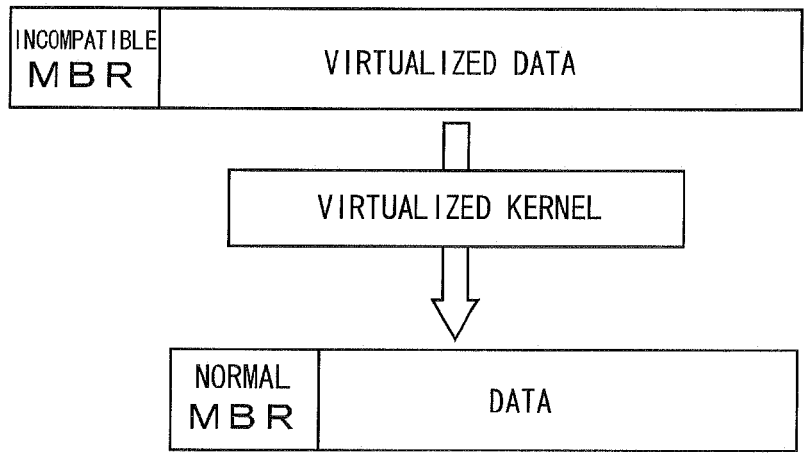

PROGRAM AND DEVICE FOR USING SECOND UNCORRUPTED MBR DATA STORED IN AN EXTERNAL STORAGE

CROSS REFERENCE TO RELATED APPLICATION

This application is a divisional of U.S. application Ser. No. 12/516,789, filed May 28, 2009 now U.S. Pat. No. 8,234,717, which is a 371 of PCT/JP2007/054203, filed Mar. 5, 2007, and claims foreign priority benefits under 35 U.S.C. 119(a)-(d) of Japanese Application No. 2006-326594, filed on Dec. 4, 2006.

TECHNICAL FIELD

The present invention relates to an information-processing device and an information management program capable of preventing the leakage of stored personal information and other important information by loss, theft, or the like.

BACKGROUND ART

In recent years, with the advancement of electronics technology and storage elements such as flash memory and the like in particular, small, high-storage capacity nonvolatile rewritable storage devices have been used in practical application. However, since these nonvolatile storage devices are primarily designed for general use so as to be usable in any personal computer or mobile device, personal information and other important information stored in the storage devices will be leaked to a third party in a case in which the storage devices are lost or stolen. Therefore, the information stored in the storage devices may be encrypted to thereby avoid the leakage of the information to a third party (e.g., see Patent Document 1).
Patent Document 1: Japanese Laid-open Patent Publication No. 2004-127183

DISCLOSURE OF THE INVENTION

Problems to be Solved by the Invention

However, when encrypted data is stored in a storage device in the manner of Patent Document 1, the device is mounted in a personal computer or a mobile device in which the storage device is plugged in, and the encrypted data as such can be accessed. Therefore, a problem is encountered in that the information can be leaked because it is possible to easily decrypt the encrypted data if the encrypting technique, e.g., the encrypting algorithm and the encrypting key data for decrypting the data, is known.

The present invention was contrived in view of the foregoing problems, and an object thereof is to provide an information-processing device and an information management program that can more reliably prevent the leakage of information by loss or theft.

Means of Solving the Problems

In order to solve the problems described above, the information-processing device according to the first aspect of the present invention is an information-processing device having data communication means (USB interface 3) for performing data communication with an external storage device (USB memory 2) for rewritably storing data in a nonvolatile manner, wherein the information processing device can read and write data stored in the external storage device by way of the data communication means, processes information related to data thus read from the external storage device, and formats the external storage device when read control information (MBR data) stored in a predetermined read control information storage area (MBR storage area) of the external storage device is invalid, the information-processing device (notebook computer 1) characterized in comprising:

read control information determination means (S2) for determining whether the read control information is valid or not;

genuine read control information extraction means (Sy6) for decrypting virtualized data stored in the external storage device on condition that the read control information is not valid, and extracting genuine read control information (genuine MBR) virtualized in the virtualized data;

genuine read control information determination means (S6) for determining whether the genuine read control information extracted in the genuine read control information extraction means is valid or not;

genuine data generation means (S10) for making genuine data generated by decrypting the virtualized data usable in the information-processing device on condition that the genuine read control data is determined to be valid in the genuine read control information determination means; and virtualized data storage means (write process) for storing invalid read control information in the read control information storage area, generating virtualized data by encrypting the valid genuine read control information and the genuine data that can be used in the information-processing device, and storing the virtualized data in a data storage area of the external storage device that corresponds to the read control information storage area.

In accordance with this aspect, the read control information is invalid and will thereby be formatted in an ordinary information-processing device when a lost or stolen external storage device is plugged into an information-processing device, and access as such to the data stored in the external storage device is impossible. Therefore, leakage of information by loss or theft can be more reliably prevented.

The information-processing device according to the second aspect of the present invention is the information-processing device according to the first aspect, characterized in comprising:

domain name acquisition means (Sk1) for acquiring a security identifier (SID) in the information-processing device (notebook computer 1) or acquiring a domain name assigned to the information-processing device on a computer network (LAN), wherein the virtualized data storage means (writing process) generates and stores (Sk5), in the data storage area of the external storage device, virtualized data that further includes the security identifier (SID) or the domain name acquired by the domain name acquisition means; and domain name determination means (Sy5) for extracting (Sy 3) the virtualized security identifier (SID) or the domain name together with the genuine read control information in the virtualized data on condition that the genuine read control information has been determined to be valid in the genuine read control information determination means, and determining whether there is a match between the security identifier (SID) or the extracted domain name and the security identifier (SID) or the domain name acquired by the domain name acquisition means, wherein the genuine data generation means (S10) makes the genuine data usable on condition that the domain name determination means has determined (output to the file system of the compatible MBR) that there is a match.

In accordance with this aspect, an external storage device can be made usable in a matching information-processing device, e.g., a device belonging to the same domain name, or only in the same information-processing device in which the security identifier (SID) is the same. Therefore, leakage of information by loss or theft can be even more reliably prevented.

The information-processing device according to the third aspect of the present invention is the information-processing device according to the first or second aspect, characterized in comprising:

domain name acquisition means (Sk1) for acquiring a domain name assigned to the information-processing device (notebook computer 1) or acquiring a security identifier (SID) in the information-processing device on a computer network (LAN), wherein the virtualized data storage means generates (Sk2) virtualized data by using the security identifier (SID) or the domain name acquired by the domain name acquisition means as an encryption key; and the genuine read control information extraction means and the genuine data generation means decrypt (Sy2) the virtualized data by using the security identifier (SID) or the domain name acquired by the domain name acquisition means as a decryption key.

In accordance with this aspect, an external storage device can be made usable by allowing decryption of virtualized data in an information-processing device that belongs to the same domain name, or only in the same information-processing device in which the security identifier (SID) is the same. Therefore, leakage of information by loss or theft can be even more reliably prevented.

The information management program according to the fourth aspect of the present invention is an information management program (virtualized kernel) executed in a program execution section (CPU 12) of an information-processing device (notebook computer 1) having data communication means (USB interface 3) for performing data communication with an external storage device (USB memory 2) for rewritably storing data in a nonvolatile manner, wherein the information processing device can read and write data stored in the external storage device by way of the data communication means, processes information related to data thus read from the external storage device, and formats the external storage device when read control information (MBR data) stored in a predetermined read control information storage area (MBR storage area) of the external storage device is invalid, the information management program characterized in that the program execution section is caused to function as:

read control information determination means (S2) for determining whether the read control information is valid or not;

genuine read control information extraction means (Sy6) for decrypting virtualized data stored in the external storage device on condition that the read control information is not valid, and extracting genuine read control information virtualized in the virtualized data;

genuine read control information determination means (S6) for determining whether the genuine read control information extracted in the genuine read control information extraction means is valid or not;

genuine data generation means (S10) for making genuine data generated by decrypting the virtualized data usable in the information-processing device on condition that the genuine read control data is determined to be valid in the genuine read control information determination means; and virtualized data storage means (writing process) for storing invalid read control information in the read control information storage area, generating virtualized data by encrypting the valid genuine read control information and the genuine data that can be used in the information-processing device, and storing the virtualized data in a data storage area of the external storage device that corresponds to the read control information storage area.

In accordance with this aspect, the read control information is invalid and will thereby be formatted in an ordinary information-processing device when a lost or stolen external storage device is plugged into an information-processing device, and access as such to the data stored in the external storage device is impossible. Therefore, leakage of information by loss or theft can be more reliably prevented.

The information management program according to the fifth aspect of the present invention is the information management program according to the fourth aspect, characterized in that the program execution section (CPU 12) is caused to function as:

domain name acquisition means (Sk1) for acquiring a security identifier (SID) in the information-processing device (notebook computer 1) or acquiring a domain name assigned to the information-processing device on a computer network (LAN);

the virtualized data storage means (Sk5) for generating and storing, in the data storage area of the external storage device, virtualized data that further includes the security identifier (SID) or the domain name acquired by the domain name acquisition means;

domain name determination means (Sy5) for extracting the virtualized security identifier (SID) or the domain name together with the genuine read control information in the virtualized data on condition that the genuine read control information has been determined to be valid in the genuine read control information determination means, and determining whether there is a match between the security identifier (SID) or the extracted domain name and the security identifier (SID) or the domain name acquired by the domain name acquisition means; and the genuine data generation means (S10) for making the genuine data usable on condition that the domain name determination means has determined that there is a match.

In accordance with this aspect, an external storage device can be made usable only in a matching information-processing device, e.g., a device belonging to the same domain name, or in the same information-processing device in which the security identifier (SID) is the same. Therefore, leakage of information by loss or theft can be even more reliably prevented.

The information management program according to the sixth aspect of the present invention is the information management program according to the fourth or fifth aspect, characterized in that the program execution section (CPU 12) is caused to function as:

domain name acquisition means (Sk1) for acquiring a domain name assigned to the information-processing device (notebook computer 1) or acquiring a security identifier (SID) in the information-processing device on a computer network (LAN);

the virtualized data storage means (Sk2) for generating virtualized data by using the security identifier (SID) or the domain name acquired by the domain name acquisition means as an encryption key; and the genuine read control information extraction means (Sy2) and the genuine data generation means for decrypting the virtualized data by using the security identifier (SID) or the domain name acquired by the domain name acquisition means as a decryption key.

In accordance with this aspect, an external storage device can be made usable by allowing decryption of virtualized data only in an information-processing device that belongs to the same domain name, or in the same information-processing device in which the security identifier (SID) is the same. Therefore, leakage of information by loss or theft can be even more reliably prevented.

BRIEF DESCRIPTION OF THE DRAWINGS

FIG. 4(a) is a diagram showing a conventional storage format stored in the flash memory 22 of the USB memory 2, and FIG. 4(b) is a diagram showing the storage format of the present invention stored in the flash memory 22 of the USB memory 2;

Figure 1:
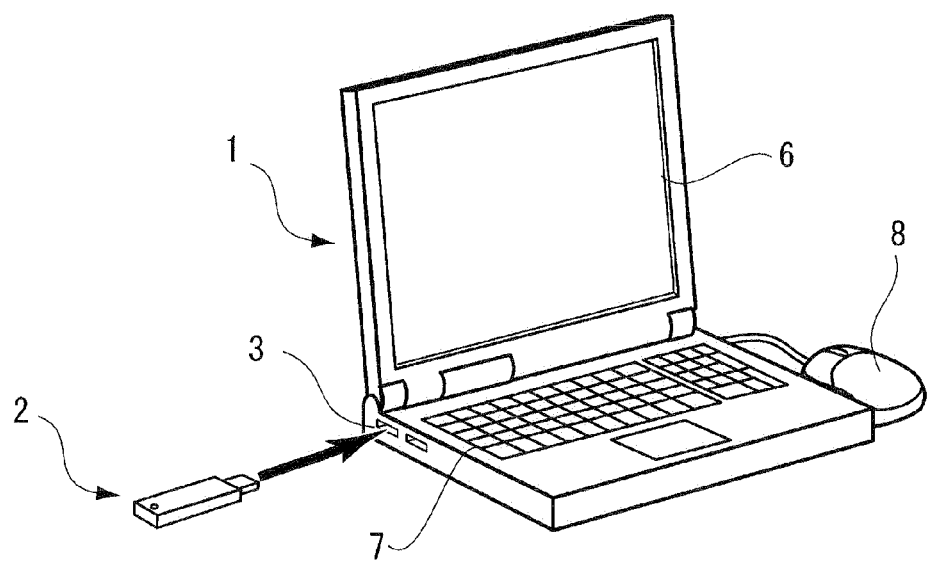
FIG. 1 is a perspective view showing a USB memory 2 and a notebook computer 1, which constitute an information-processing device in the examples of the present invention.

1 Notebook computer
2 USB memory
3 USB interface section
6 Display
7 Keyboard
8 Mouse
11 Data bus
12 CPU
13 RAM
14 Operation input section
15 Storage device
16 Display processor
17 Communication section
21 USB controller

BEST MODE FOR CARRYING OUT THE INVENTION

Examples of the present invention are described below.

EXAMPLES

Examples of the present invention will be described with reference to the drawings. First, FIG. 1 is a perspective view showing an overall image of a notebook computer 1 and a USB memory 2, which constitute an information-processing device in the present example.

Figure 2:
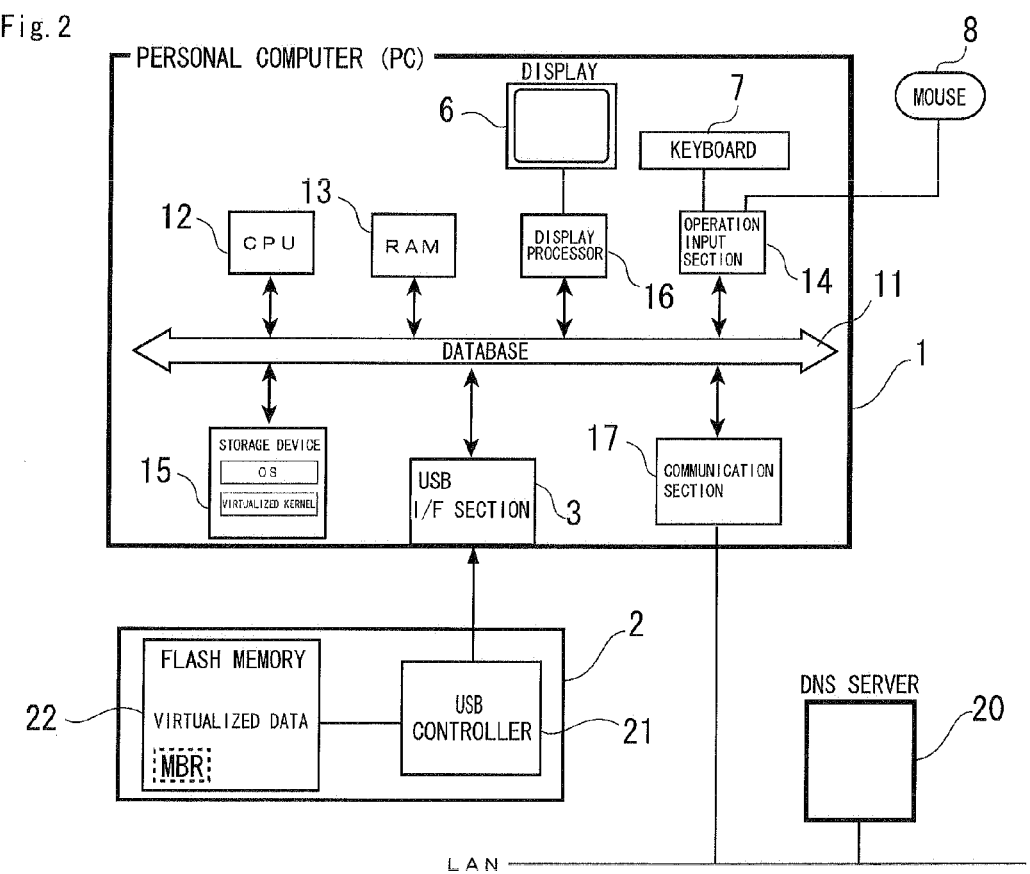
FIG. 2 is a block diagram showing the configuration of the notebook computer 1 and the USB memory 2 in the examples of the present invention.

First, as shown in FIG. 2, the notebook computer 1 used in the present example is an ordinary computer in which the following components are connected to a data bus 11 for sending and receiving data inside the computer: a CPU 12 for executing an operating system program (OS) stored in a later-described storage device 15, executing various processes based on the operating system program (OS) and a later-described virtualized kernel driver (program), and processing information based on data read from a USB memory 2; a RAM 13 used as work memory or the like; an operation input section 14 to which a keyboard 7 and a mouse 8 are connected; a storage device 15 composed of a hard disk drive (HDD); a display processor 16 connected to a display 6 and composed of a graphics board or the like for generating a display screen to be displayed on the display 6; a communication section 17 for performing data communication between other computers on a local area network (LAN) and a DNS server 20 or other server computer; and a USB interface 3 having a connector to which the USB memory 2 is connected, and also having a communication section for exchanging data with the USB memory 2.

As shown in FIG. 1, the USB interface 3 described above is provided to the side surface part of the notebook computer 1, and the USB memory 2 to which the USB interface 3 is connected is a quadrangular storage medium as viewed in cross section, as shown in FIG. 1. A flash memory 22, which is nonvolatile memory, and a USB controller 21 locally connected to the flash memory 22 are mounted inside the USB memory, and data is exchanged through the USE interface 3 of the notebook computer 1 to which the USE controller 21 is connected.

As described below, master boot recorder (MBR), which is the read control information of the present invention, is stored in the flash memory 22, and virtualized data obtained by encrypting is also stored therein.

In the present example, a PC-AT compatible notebook computer is used as the notebook computer 1, and Windows XP (US, Microsoft registered trade name) can be used as the operating system program (OS). The program can recognize the USB interface 3 and the HDD storage device 15, and can initiate the USB interface 3 and the HDD storage device 15 by formatting.

The notebook computer 1 is connected to a local area network (LAN) via a communication section 17. The operating system program (OS) installed in the notebook computer 1 can acquire a domain name, which is assigned by the local area network (LAN) to which the notebook computer 1 is connected, from the DNS server 20. The server is connected to the local area network (LAN) and manages the domain names of the computers connected to the local area network (LAN). The acquired domain name can be outputted to the virtualized kernel driver (hereinafter abbreviated as virtualized kernel). In other words, the domain name acquired by the virtualized kernel from the operating system program (OS) is the domain name acquired from the DNS server 20.

A virtualized kernel, which is the information management program in the present invention, is stored together with the operating system program (OS) in the storage device 15 of the notebook computer 1.

Figure 3:
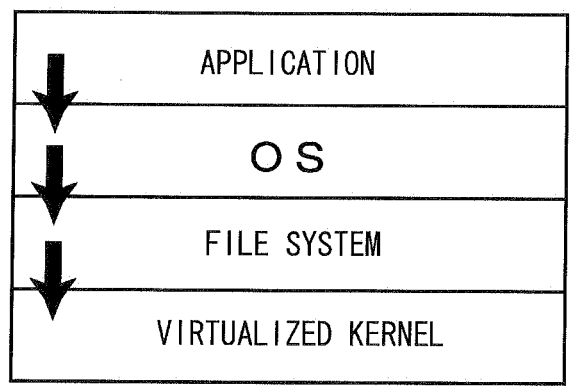
FIG. 3 is a diagram showing the access configuration of the program in the notebook computer 1, which constitutes an information-processing device in the examples of the present invention.

The virtualized kernel functions as a driver program in the operating system program (OS). As shown in FIG. 3 an application that operates within the operating system program (OS) accesses the operating system program (OS), whereby the operating system program (OS) is caused to access the file system in accordance with the access [performed by the application] (*1). The virtualized kernel is accessed by the file system in accordance with the access performed by the operating system program (OS), and is installed as a driver program after the operating system program (OS) has been installed.

In a case in which the USB memory 2 is plugged into a conventional ordinary personal computer provided with an installed virtualized kernel, the storage format of the data stored in the flash memory 22 is one in which a master boot recorder (MBR) that is compatible with the operating system program (OS) is stored in a predetermined area of the header that serves as the read control information area of the flash memory 22, as shown in FIG. 4(a). The master boot recorder (MBR) is stored in a predetermined storage area, and data that can be used by the operating system program (OS) is stored without modification.

In a case in which the USB memory 2 is plugged into the notebook computer 1 of the present example provided with an installed virtualized kernel, the storage format of the data stored in the flash memory 22 is one in which a master boot recorder (MBR) that is incompatible with the operating system program (OS) is stored in a predetermined area of the header that serves as the read control information area of the flash memory 22, as shown in FIG. 4(b). The master boot recorder (MBR) is invalid, and virtualized data that has been virtually formatted by encryption and cannot be directly used by the operating system program (OS) is also stored. The virtualized data is decrypted by the virtualized kernel to generate a master boot recorder (MBR) (genuine master boot recorder (MBR)) encrypted in the virtualized data and made compatible with the operating system program (OS), and also to generate data (genuine data) that can be used by the operating system program (OS).

In the notebook computer 1 of the present example provided with a virtualized kernel, the setting for enabling the use (mounting) of an ordinary USB memory 2 and the setting for disabling the use (mounting) of an ordinary USB memory 2 can be selected on a setting screen (not shown). When the use-enabling (mounting-enabling) setting is selected, "0" is stored as the set value of the setting registry; and when the use-disabling (mounting-disabling) setting is selected, "1" is stored as the set value of the setting registry.

Figure 5:
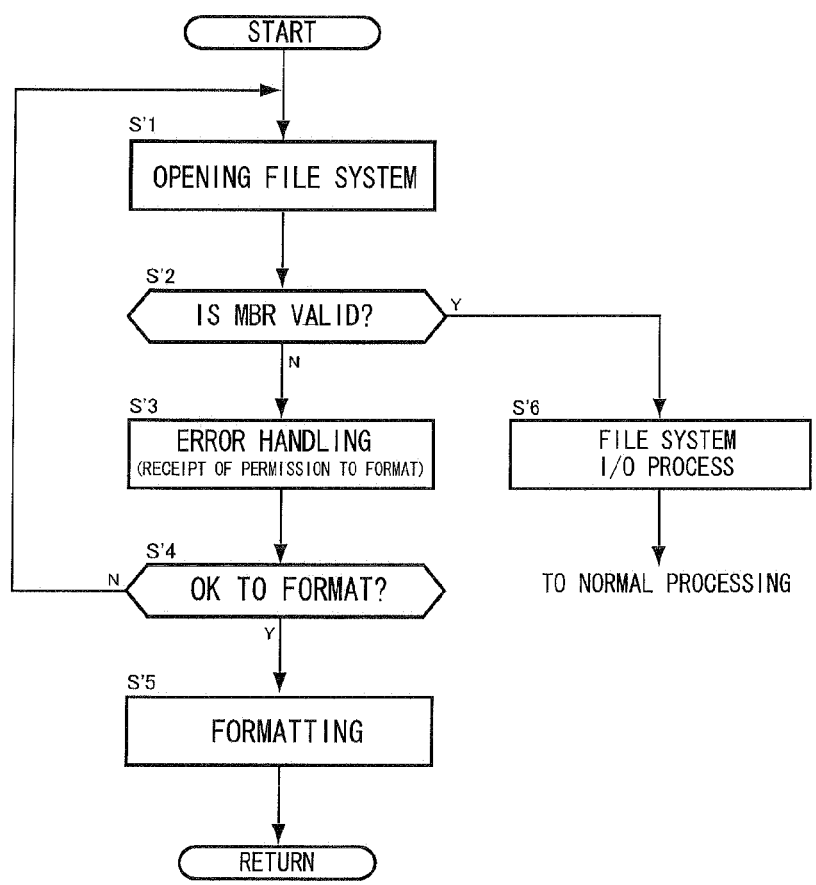
FIG. 5 is a flowchart showing the processes executed by a notebook computer in which a virtualized kernel has not been installed.

Following is a description, made with reference to the flowchart shown in FIG. 5, of the flow for a case in which the USB memory 2 is used in a notebook computer (which has the same configuration as the notebook computer 1 except that the virtualized kernel has not been installed) not provided with an installed virtualized kernel of the present example.

In a case in which the USB memory 2 is plugged into a notebook computer not provided with an installed virtualized kernel, first, an opening process (S'1) is carried out in the file system, as shown in FIG. 5, and data (MBR data) stored in a predetermined area in the header of the read control information area of the flash memory 22 is read.

It is then determined whether the data (MBR data) thus read is a valid value (S'2). If the answer is affirmative, the process advances to S'6, and the I/O process in the file system is executed, whereby the USB memory 2 is mounted as a drive and is then switched over to ordinary processing, allowing data to be written to and read from the USB memory 2.

In other words, since the data (MBR data) thus read is ordinarily a valid value, access to the data stored in the USB memory 2 is permitted when the USB memory 2 is mounted by being plugged in.

On the other hand, in a case in which the data (MBR data) thus read is determined to be invalid in step S'2, the process proceeds to step S'3 and error handling is carried out to receive permission or refusal to initialize the plugged-in USB memory 2 by formatting. In a case in which permission to format has been received in the error handling, "Yes" is determined to be the outcome in step S'4, the process proceeds to step S'5, and the plugged-in USB memory 2 is initialized by formatting.

In a case in which permission to format has not been received in the error handling, "No" is determined to be the outcome in step S'4, and the process proceeds to step S'1, whereby the error handling of S'3 is repeated to receive permission or refusal for initialization.

Figure 6:
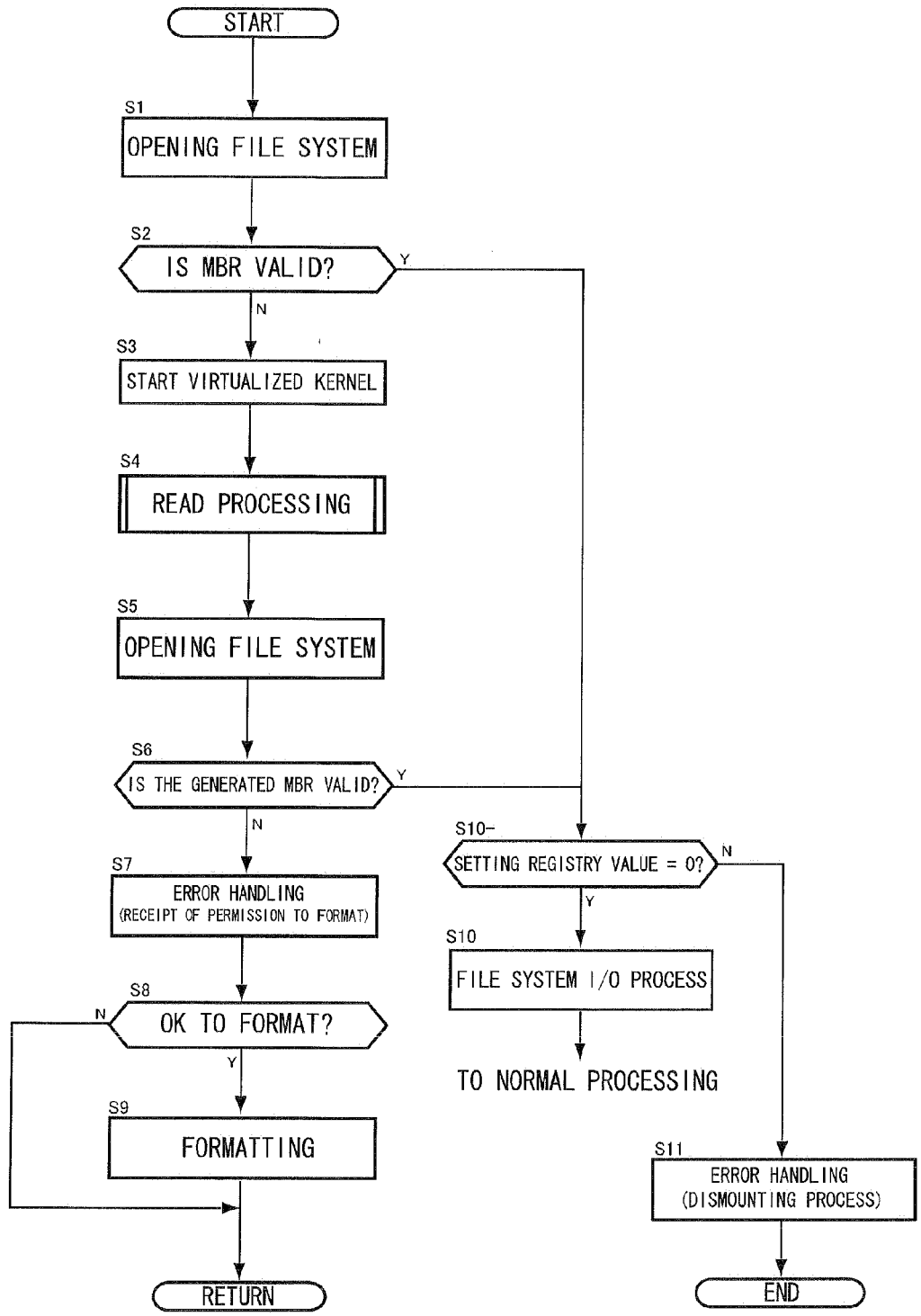
FIG. 6 is a flowchart showing the processes executed by the notebook computer 1 in which the virtualized kernel of the present example has been installed.

By contrast, following is a description, made with reference to the flowchart shown in FIG. 6, of the flow for a case in which the USB memory 2 has been plugged into a notebook computer 1 provided with an installed virtualized kernel of the present example.

In a case in which the USB memory 2 is plugged into a notebook computer 1 provided with an installed virtualized kernel of the present example, first, an opening process (S1) is carried out in the file system, as shown in FIG. 6, and data (MBR data) stored in a predetermined area in the header of the read control information area of the flash memory 22 is read.

It is determined whether the data (MBR data) thus read is a valid value (S2). If the answer is affirmative, the process advances to S10 and the value of the setting registry is determined. If the value of the setting registry is "0," i.e. if the setting enables the use (mounting) of an ordinary USB memory 2, the process advances to S10 and the I/O process in the file system is executed, whereby the USB memory 2 is mounted as a drive, a switch is made to ordinary processing, and data can be written to and read from the USB memory 2. If the value of the setting registry is set to "1," i.e., a setting is selected so that the use (mounting) of the USB memory 2 is disabled, the process advances to step S11, error handling that includes a dismounting process for dismounting the USB memory 2 is carried out, and the process is ended.

In other words, valid MBR data is stored in an ordinary usable USB memory 2 in an ordinary notebook computer not provided with the installed virtualized kernel. Therefore, "Yes" is determined to be the outcome in step S2, and the process advances to S10. If the setting enables the use (mounting) of an ordinary USB memory 2, the process advances to step S10, whereby the plugged-in USB memory 2 is mounted as a drive. If the setting disables the use (mounting) of an ordinary USB memory 2, the process proceeds to step S11, and error handling is carried out, whereby the plugged-in USB memory 2 is not mounted and therefore cannot be used.

Figure 7:
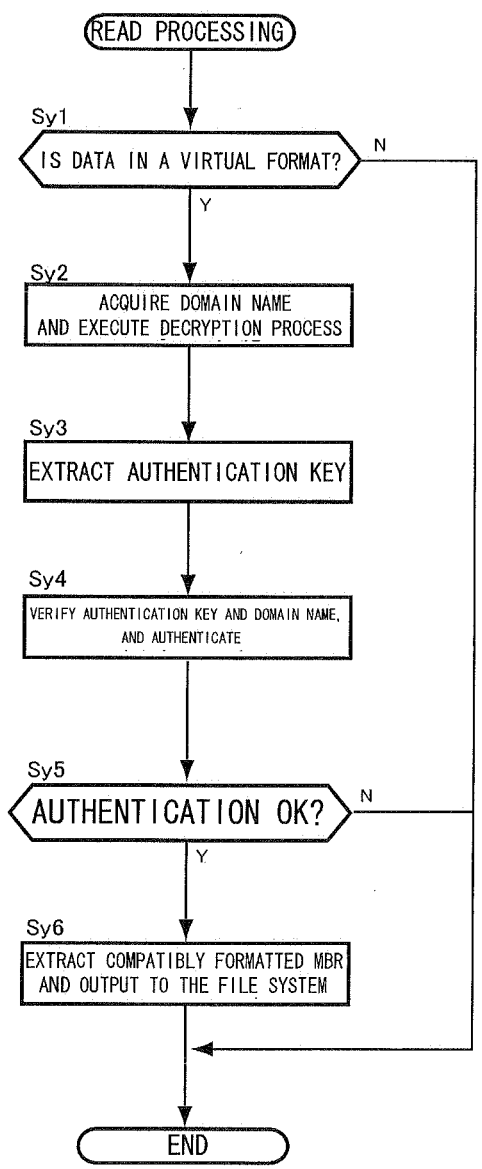
FIG. 7 is a flowchart showing the details of the reading process executed by the virtualized kernel of the present example.

On the other hand, when the data (MBR data) thus read in step S2 is not a valid value, the process proceeds to step S3, the virtualized kernel is started, and the started virtualized kernel executes the read process (S4) shown in FIG. 7.

In the read process carried out by the virtualized kernel of the present example, first, it is determined whether the data stored in the plugged-in USB memory 2 is virtualized data having a predetermined virtual format (Sy1).

The read process is ended in a case in which the virtual format is not present. In a case in which the virtual format is present, the process proceeds to step Sy2, a domain name is acquired from the operating system program (OS), and a decryption process for decrypting the virtualized data is carried out using the acquired domain name as the decryption key.

An authentication key is extracted from the decrypted data (Sy3), the extracted authentication key and the domain name acquired in Sy2 are thereafter verified, and it is verified and authenticated whether the two domain names match each other, i.e., it is verified and authenticated in the present example whether the two domain names are the same or not (Sy4).

In the present example, the condition is that the domain names are in complete agreement with each other, i.e., are the same, but the present invention is not limited to a complete agreement, and it is also possible to determine that verification is successful as long as the domain names match each other so that predetermined parts of the domain names, e.g., the top parts or the like of the domain names, are the same.

When the authentication produces a negative result, i.e., when the two domain names are not the same, "No" is determined to be the outcome in step Sy5, and the read process is ended. On the other hand, when the authentication produces a positive result, i.e., when the two domain names are the same, the process proceeds to step Sy6, the MBR data having a compatible format is extracted from the decrypted data in step Sy2, and the extracted MBR data is outputted to the file system.

In the present example, a mode was described in which the compatibly formatted MBR data and the authentication key were decrypted together in advance, but the present invention is not limited to this option alone, and the MBR data may be decrypted separately in step Sy6.

In other words, in the read process in S4 of the present example, the data stored in the plugged-in USB memory 2 is virtualized data having a predetermined virtual format, and the decrypted MBR data is outputted to the file system on the condition that the decrypted authentication key is in agreement with the domain name assigned by the LAN to which the notebook computer 1 is connected. The MBR data is otherwise not outputted to the file system.

Following these read processes, the process proceeds to step S5, and an opening process is carried out in the file system again, whereupon it is determined whether the MBR data outputted to the file system is a valid value or not (S6).

When it has been determined that the MBR data outputted to the file system is a valid value, "Yes" is determined to be the outcome in S6, the process proceeds to step S10, and the I/O process in the file system is carried out. The USB memory 2 is thereby mounted as a drive, and data can then be read from and written to the USB memory 2 by switching to ordinary processing. In this case, data decrypted by the virtualized kernel and made compatible with the operating system program (OS) can be read by being outputted to the file system in step Sy2.

In the present example, a mode was described in which the compatible data is decrypted in advance in step Sy2 together with the authentication key and the compatibly formatted MBR data, but the present invention is not limited to this option alone, and the compatible data may be decrypted separately in step S10, which is the point at which the USB memory 2 is mounted as a drive.

When "No" is determined to be the outcome in step S6, i.e., when the MBR data has not been outputted in the read process, the process proceeds to step S7, and error handling is carried out to receive permission or refusal to initialize the plugged-in USB memory 2 by formatting. In a case in which permission to format has been received in the error handling, "Yes" is determined to be the outcome in step S8, the process proceeds to step S9, and the plugged-in USB memory 2 is initialized by formatting.

In a case in which permission to format has not been received in error handling, "No" is determined to be the outcome in step S8, and the process returns to step S1, whereby the error handling of S7 is repeated to receive permission or refusal for initialization.

Figure 8:
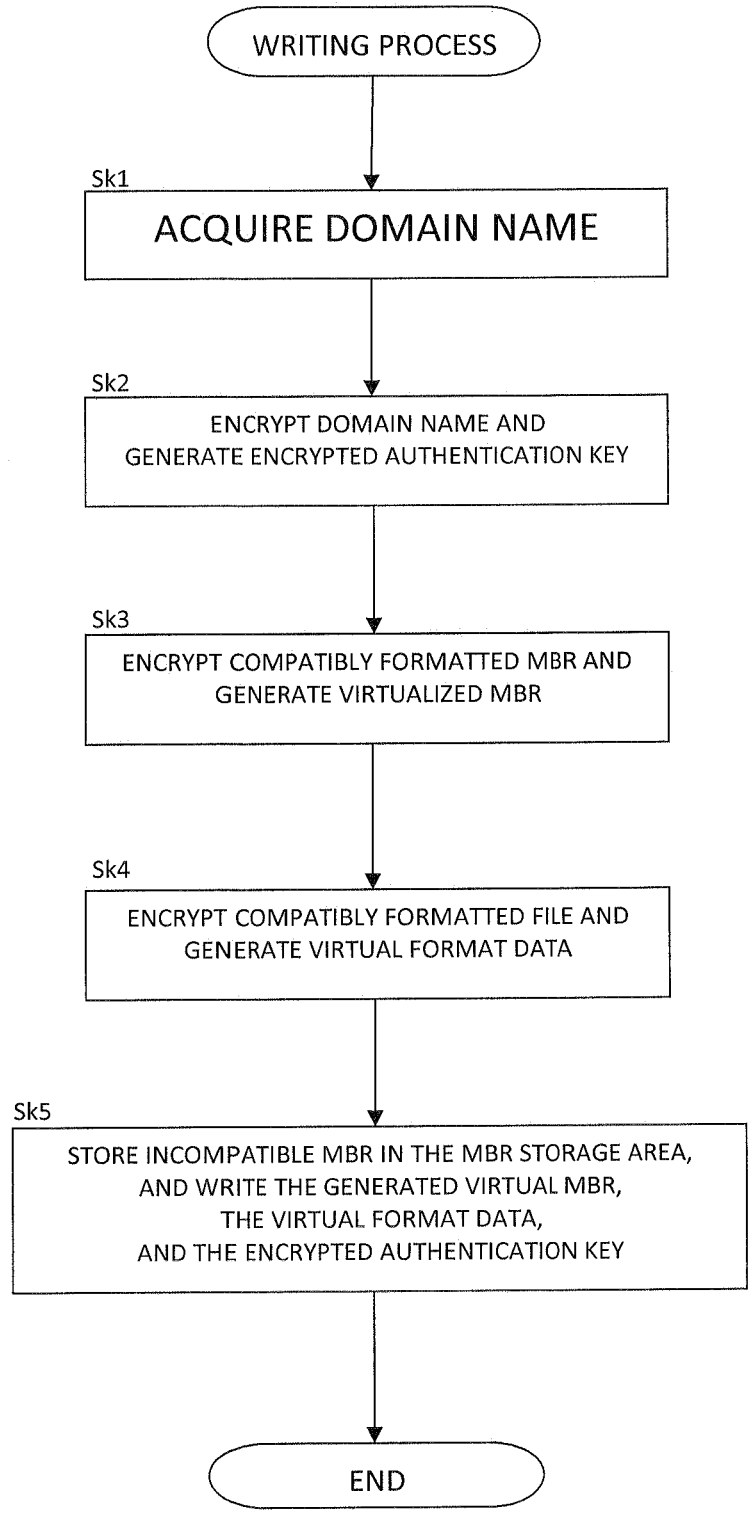
FIG. 8 is a flowchart showing the details of the writing process executed by the virtualized kernel of the present example.

Next, the details of the writing process executed by the virtualized kernel in the notebook computer 1 of the present example will be described with reference to FIG. 8 for a case in which data is written to the plugged-in USB memory 2. First, the virtualized kernel acquires (Sk1) a domain name from the operating system program (OS) and generates (Sk2) an encrypted authentication key by encrypting the acquired domain name using the domain name as the encryption key.

Virtual MBR is generated (Sk3) by encrypting the compatibly formatted MBR, i.e., the MBR data outputted to the file system in step Sy6, using the encryption key of the domain name acquired in step Sk1.

Compatibly formatted file data to be written is encrypted using the encryption key of the domain name acquired in step Sk1, and virtualized data having a virtual format is generated.

The process then proceeds to step Sk5, and incompatible MBR data having an invalid value is stored in a predetermined area (MBR storage area) in the header of the read control information area in the flash memory 22 of the USB memory 2. The encrypted authentication key, virtual MBR, and virtualized data generated in steps Sk2, Sk3, and Sk4 are stored in the storage area that corresponds to the incompatible MBR data, and the process is ended.

Situations may thus occur in which a USB memory 2 written over by the writing process of a virtualized kernel is lost or stolen, and the lost or stolen USB memory is plugged into an ordinary personal computer in which the virtualized kernel has not been installed. In such a situation, "No" is determined to be the outcome in S'2, as shown in the flowchart of FIG. 5, and the USB memory 2 is initialized by formatting without being mounted because incompatible MBR data is stored in the MBR storage area of the flash memory 22, as described above.

In contrast, when the USB memory 2 is again plugged into a notebook computer 1 in which data has been written, "Yes" is determined to be the outcome in S6, and the process proceeds to step S10 in the procedure shown in FIG. 6. Therefore, the USB memory 2 can be mounted and the various data stored in the USB memory 2 can be read and used in the notebook computer 1.

In the case of a personal computer other than a notebook computer 1 in which data has been written, there may be situations in which the virtualized kernel is installed similarly to the notebook computer 1, and the personal computer is connected to the same LAN as the notebook computer 1. In such situations, "Yes" is determined to be the outcome in S6, and the process proceeds to step S10 in the procedure shown in FIG. 6 in the same manner as in the case of the notebook computer 1 in which data has been written. Therefore, the USB memory 2 can be mounted and the various data stored in the USB memory 2 can be read and used in the notebook computer 1.

On the other hand, "No" is determined to be the outcome in step Sy5 of the read process shown in FIG. 7 in the case of a personal computer connected to a LAN having a different domain name from the notebook computer 1. This occurs even in the case of a personal computer provided with an installed virtualized kernel in the same manner as in the case of the notebook computer 1. The USB memory 2 can thereby be initialized by formatting without being mounted.

In accordance with the present example, when a lost or stolen external-storage USB memory 2 is plugged into an ordinary notebook computer as an information-processing device in which the virtualized kernel has not been installed, the MBR data as the read control information is not valid for the ordinary notebook computer, whereby the plugged-in external-storage USB memory 2 is formatted. Therefore, leakage of information by loss or theft can be more reliably prevented because access as such to the data stored in the USB memory 2 (external storage device) is made impossible.

In accordance with the present example, the USB memory 2 (external storage device) can be used only in a matching notebook computer 1, i.e., a computer that belongs to the same domain name, and leakage of information by loss or theft can therefore be even more reliably prevented. Also, since the USB memory 2 (external storage device) can be used in a plurality of notebook computers 1 that belong to the same domain name and are provided with an installed virtualized kernel, the notebook computers 1 or other information-processing devices can be used more effectively in a company or the like.

In accordance with the present example, an acquired domain name is used as the encryption key, and decryption as such is thereby made impossible in an information-processing device that belongs to a different domain name. Therefore, leakage of information by loss or theft can be even more reliably prevented because a USB memory 2 (external storage device) can be used by the decryption of virtualized data only in an information-processing device that belongs to the same domain name.

Examples of the present invention were described above with reference to the diagrams, but the specific configuration is not limited to the examples, and the present invention includes additions and modifications in a range that does not depart from the spirit of the present invention.

For example, in the examples, the virtualized kernel acquires a domain name acquired by the operating system program (OS) from the DNS server 20, and uses the domain name in various determinations and as an encryption key, but the present invention is not limited to this option alone. Instead of a domain name, it is possible to acquire a security identifier (SID) uniquely provided to a user, user group, or other operator of a notebook computer 1 managed by the operating system program (OS) installed in the notebook computer 1, and to use [the security identifier] to check for a match and as an encryption key for generating virtualized data. Sy adopting such a configuration, the present invention may be used even when an information-processing device is not connected to a computer network, for example. A specific effect is that only the same user or a user from the same group can access and use the data stored in a USB memory 2 (external storage device) plugged into a notebook computer 1 having the same security identifier (SID). Therefore, it is possible to more reliably obtain the effect of the present invention, which is to prevent the leakage of information due to loss or theft.

It is also possible to acquire and use a domain name and a security identifier (SSD) rather than only one of the two options, and to determine whether there is a match in one of the two acquired options.

In the examples, a USB memory 2 is used as an example of an external storage device, but the present invention is not limited to this option alone, and card-type external storage devices with non-volatile memory may be used as the external storage devices. It is also possible to use a small hard disk device provided with a USB interface, or an external device that can rewritably store data in a non-volatile manner and can be attached to and detached from the information-processing device.

In the examples, a domain name is used as an authentication key and an encryption key, but the present invention is not limited to this option alone, and other types of information, e.g., a unique machine ID, PIN number, or other information received from the user may be used in an information processing terminal as the authentication key and/or the encryption key.

The invention claimed is:

1. An information-processing device having a data communication device for performing data communication with an external storage device to re-write storing data in a non-volatile memory, wherein the information processing device can read and write data stored in said external storage device by way of the data communication device, processes information related to data thus read from said external storage device, and reads first master boot record (MBR) data stored in a predetermined first storage area of said external storage device, the information-processing device comprising:
   a virtualized data storage device for storing invalid first MBR data in said first storage area, generating virtualized data by encrypting valid second MBR data and genuine data that can be used in the information-processing device, and storing the virtualized data in a predetermined second storage area of said external storage device;
   a first determination processor for determining whether the first MBR data in said first storage area is valid or not;
   a second MBR data extraction processor for decrypting virtualized data stored in said external storage device on condition that said first MBR data in said first storage area is not valid, and extracting the second MBR data virtualized in the virtualized data;
   a second determination processor for determining whether said second MBR data extracted in the second MBR data extraction processor is valid or not; and,
   a genuine data generation processor for making said genuine data generated by decrypting said virtualized data usable in the information-processing device on condition that said second MBR data is determined to be valid in said second determination processor, or formatting said external storage device on condition that said second MBR data is determined to be invalid in said second determination processor.

2. An information management program on non-transitory machine readable medium executed in a program execution section of an information-processing device having data communication device for performing data communication with an external storage device to re-write storing data in a non-volatile memory, wherein the information processing device can read and write data stored in said external storage device by way of the data communication device, processes information related to data thus read from said external storage device, and reads first master boot record (MBR) data stored in a predetermined first storage area of said external storage device, wherein said program execution section is caused to function as:
   a virtualized data storage device for storing invalid first MBR data in said first storage area, generating virtualized data by encrypting valid second MBR data and genuine data that can be used in the information-processing device, and storing the virtualized data in a predetermined second storage area of said external storage device;
   a first determination processor for determining whether the first MBR data in said first storage area is valid or not;
   a second MBR data extraction processor for decrypting virtualized data stored in said external storage device on condition that said first MBR data in said first storage area is not valid, and extracting the second MBR data virtualized in the virtualized data;

a second determination processor for determining whether said second MBR data extracted in the second MBR data extraction processor is valid or not;

a genuine data generation processor for making said genuine data generated by decrypting said virtualized data usable in the information-processing device on condition that said second MBR data is determined to be valid in said second determination processor, or formatting said external storage device on condition that said second MBR data is determined to be invalid in said second determination processor.

\* \* \* \* \*